United States Patent [19]

Boa et al.

[11] 4,341,333
[45] Jul. 27, 1982

[54] BLOCK HANDLING APPARATUS

[75] Inventors: Walter Boa, Bedford; Peter M. Grundon, Flitton, both of England

[73] Assignee: National Research Development Corporation, London, England

[21] Appl. No.: 173,741

[22] Filed: Jul. 30, 1980

[30] Foreign Application Priority Data

Aug. 3, 1979 [GB] United Kingdom ................. 7927197
Jun. 3, 1980 [GB] United Kingdom ................. 8018140

[51] Int. Cl.³ .............................................. B26F 3/02
[52] U.S. Cl. ......................................... 225/96; 47/77;
111/2; 225/101; 225/106
[58] Field of Search ...................... 225/96, 101, 106, 2,
225/1, 5; 47/77, 86; 111/2, 3; 83/277, 153, 236,
262, 155, 371, 280

[56] References Cited

U.S. PATENT DOCUMENTS

| | | | |
|---|---|---|---|
| 1,953,196 | 4/1934 | Smith et al. | 83/280 X |
| 2,353,405 | 7/1944 | King | 83/277 X |
| 2,465,304 | 3/1949 | Wyrick | 83/236 |
| 2,819,467 | 1/1958 | Marks | 83/277 X |
| 3,133,684 | 5/1964 | Wiltshire et al. | 225/101 |
| 3,709,403 | 1/1973 | Harriman | 225/106 X |
| 3,719,158 | 3/1973 | Roths | 111/2 |
| 3,872,805 | 3/1975 | Kolk et al. | 111/2 |
| 4,005,626 | 2/1977 | Bateman et al. | 83/278 X |
| 4,132,337 | 1/1979 | Masuda et al. | 225/5 |

FOREIGN PATENT DOCUMENTS

1545554 5/1979 United Kingdom .
451422 7/1975 U.S.S.R. ................................ 111/2

Primary Examiner—Frank T. Yost
Attorney, Agent, or Firm—Cushman, Darby & Cushman

[57] ABSTRACT

Apparatus for handling a bandolier comprising detachment means for detaching an end block-embracing portion of the bandolier and feed means for intermittently feeding the bandolier to the detachment means so that each successive operation of the detachment means detaches a single end block-embracing portion from the remainder of the bandolier. These blocks are fed to a transplanter machine on which the bandolier handling assembly is mounted.

12 Claims, 14 Drawing Figures

BLOCK HANDLING APPARATUS

The present invention relates to an apparatus for handling growing blocks, in particular plant-bearing growing blocks interconnected as a bandolier of such blocks.

The term "bandolier" in this context, and as used hereinafter throughout the specification, is to be interpreted as meaning a string of growing blocks linked together by a joining medium with each block having, when arranged for normal use, an upper face for growing a plant and a lower face for the block to stand on. Usually the joining medium will comprise two joining strips each of which follows a path around part of the perimeter of a block followed by a linking path to the next block, followed by a path around part of the perimeter of the said next block, and so on, the two joining strips following in a joined relationship a common linking path between the blocks, and the two joining strips encompassing the sides of the blocks and leaving the upper and lower faces of the blocks uncovered, the material in each growing block being in a compressed state sufficiently compressed to allow the block to adhere in a preformed shape between the joining strips. The linking path referred to above will generally be provided by substantially constant length spacing portions of the joining medium and although it is usually preferred to have each growing block in the form of a right circular cylinder, other shapes may be used as a non-circular cylinder having an octagonal, square, triangular or other cross-section.

A known method of growing plants, particularly from seeds or seedlings but also from cuttings, makes use of growing blocks, commonly known as soil blocks which comprise preformed quantities of material such as compressed soil, peat, or compost. The seed or seedling is placed in the block, allowed to grow to a predetermined size of a plant in controlled conditions such as a greenhouse, and the whole block with plant is then transplanted to allow further growth, for example in an open field.

The use of growing blocks is advantageous for producing uniform growth of plants in large quantities and the bandolier configuration described above is particularly beneficial in adapting such a system for automatic or semi-automatic transplanting.

It is an object of the invention to provide a block-handling apparatus for use in this stage.

A block-handling system has recently been disclosed in U.S. Pat. No. 4,132,337 in which the bandolier is continuously moved towards a pair of block-detaching rollers which tear off an end block-embracing part of the bandolier across a pre-perforated line of weakness in the bandolier. This system is subject to a number of disadvantages amongst which one of the most serious is that the nature of the block-detaching rollers may place practical restrictions on the shape of block that can be present in the bandolier for the system to work satisfactorily.

According to the present invention, apparatus for handling a bandolier as hereinbefore defined comprises detachment means for detaching an end block-embracing portion of the bandolier and feed means for intermittently feeding the bandolier to the detachment means so that each successive operation of the detachment means detaches a single end block-embracing portion from the remainder of the bandolier.

Conveniently, the detachment means comprises cutting means for cutting the strip.

Alternatively, the detachment means may comprise cutting or strip weakening first means in combination with a holding means spaced along the bandolier path from the cutting or strip-weakening means, a tearing action being achieved by an increased separation of the first means and the holding means along the bandolier path.

Conveniently in such cases the strip-weakening means may comprise a perforating means. In one such embodiment for example the perforating means comprises a perforating male member on one side of the bandolier path arranged to co-operate with an appropriate female member on the other side of the path.

Conveniently, the holding means comprises a clamp but in alternative embodiments the holding means comprises a strip-weakening means in which case increased separation of the first means and the holding means may be used not only to detach the end block-embracing portion of the bandolier, but also to remove part or substantially all of the spacing portion of the joining medium immediately following that block-embracing portion.

Conveniently, the feed means includes gripper elements mounted on two support members, the gripper elements on one side of the bandolier path being mounted on one of these members, and the gripper elements on the other side of the bandolier path being mounted on the other one of the members.

To bring the gripper elements into and out of engagement with the bandolier, the support members are conveniently each movable with a component of motion perpendicular to the bandolier path. Conveniently this result is achieved by having the two support members pivoted for movement in a horizontal plane.

Where the support members above referred to are present in the apparatus, movement of the support members towards the bandolier path to bring the gripper elements into gripping engagement with the bandolier may also be used to initiate operation of the detachment means, as for example by bringing the holding means into use when such means are included in the detachment means.

In addition to being able to swing with the support members about a pivot, the gripper elements are also preferably arranged to be movable with a translational component parallel to the path of the bandolier through the apparatus.

This combined pivotal and translational component is achieved in preferred embodiment of the invention by having the support members each arranged to telescope in a direction passing through and perpendicular to the pivot axis of the respective member.

Conveniently the support members are associated with a control system comprising a latch mechanism which operates to move them from a pivotally open to a semi-closed position, a cam mechanism which operates to move them from the semi-closed position to a fully closed position, and a delatching mechanism which operates to return the support members to the fully open position.

Conveniently, each support member is pivotally connected to a reciprocating drive member, and the latch, cam and delatching mechanisms, are automatically brought into operation in dependence on the position of the drive member relative to a base member of the apparatus.

The drive member is preferably arranged so that between the operation of the cam and delatching mechanism, the continued movement of the drive member towards the position at which delatching will occur results in a corresponding elongation of the fully closed support members.

In preferred embodiments, the detachment means comprises cutting or strip-weakening first means mounted on first parts of the support means in combination with a holding means spaced along the bandolier path from the cutting or strip-weakening means and mounted on second parts of the support means, a tearing action being achieved by an increased separation of the first means and the holding means along the bandolier path. Conveniently, said increased separation between the two means is achieved by using stop means to prevent the first parts of the support members from following the second parts during said continued movement of the drive member.

According to a preferred feature, the cam arrangement may include pressure release means operative when the support members are in their fully closed positions at commencement of the elongation process.

Conveniently the support members are arranged, on the return stroke of the drive member, to return in their pivotally fully open state to their original positions and to contract to their original lengths during this return movement.

Conveniently, the feed means operates with a dwell period during which it releases the detached block-embracing portion referred to above, and in one such embodiment the support means carry block-engaging means on the opposite side of the detachment means to the bandolier path, the block-engaging means being operative to support the end block-embracing portion of the bandolier against release following its detachment from the remainder of the bandolier, the block-engaging means being adapted to release said detached end portion only during said dwell period of the feed means. Conveniently, in this case, a stop is provided to prevent translational movement of the gripper elements during further movement of the drive member away from the bandolier path following operation of the detachment means but immediately prior to operation of the delatching mechanism, said further movement of the drive means being operative to open the block-engaging means to release the detached end-portion therefrom.

Conveniently, the bandolier is fed to the feed means round a driven continuously-rotating roller or wheel rotating in the sense of bandolier movement but with a peripheral velocity in excess of that imparted on the bandolier by the feed means during the intermittent travel of the bandolier towards the detachment means.

The invention also includes a transplanter assembly comprising a transplanter machine having a mechanical feed for depositing plant-bearing growing blocks in the ground and a handling apparatus according to the present invention for presenting the machine with individual growing blocks as they are detached from a bandolier of such blocks.

Conveniently, the handling apparatus is mounted on the transplanter machine.

Conveniently, the transplanter machine comprises a pair of belt conveyors operative to transport substantially vertically downwards each block-embracing bandolier portion released by the feed means e.g. for discharge into a preformed furrow.

Alternatively, the machine may comprise a planting wheel having pockets arranged to receive block-embracing bandolier portions released by the feed means and to deposit these portions in the ground.

Conveniently, the planting wheel includes scraper means for removing earth attaching to the machine during operation of the machine and depositing it on the ground between successive growing block locations.

Embodiments of the invention will now be described, by way of example only, with reference to the accompanying drawings, in which.

Figure 8:
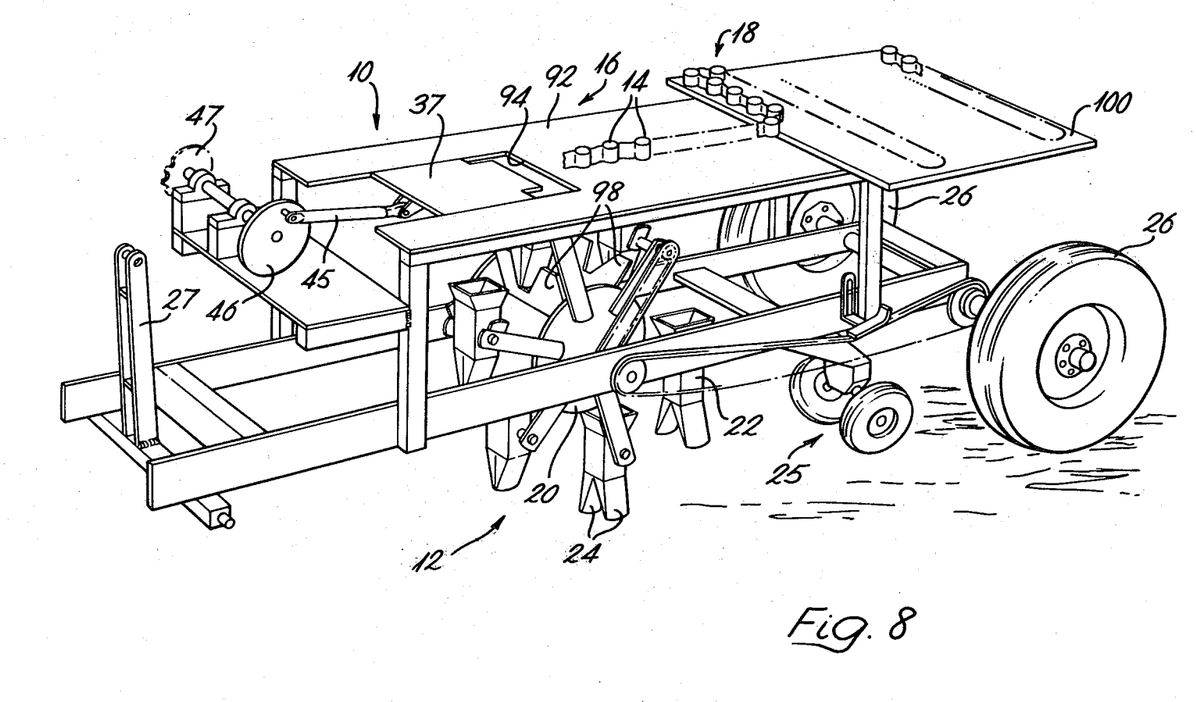
FIG. 8 is a side perspective view of a transplanter assembly incorporating the feed apparatus of FIGS. 1 to 7.

Referring first to FIG. 8, a transplanter assembly 10 comprises a transplanter machine 12 for transplanting plant-bearing growing blocks 14 in the ground and a block-handling apparatus 16 for presenting the machine with individual growing blocks from a bandolier 18 charged with such blocks. For clarity and convenience the plants have been omitted from the illustration and only the lower portions of the apparatus 16 have been included.

In essence, machine 12 comprises a planting wheel 20 carrying six vertically disposed pockets 22 arranged in turn to receive an end block-embracing portion of the bandolier from block-handling apparatus 16. As the planting wheel is rotated, each pocket is plunged into the ground where the jaws 24 of the pocket open to release its charge. The block and its bandolier portion are firmed in by two appropriately inclined wheels 25 positioned between ground wheels 26 at the rear end of the machine. An adapter 27 for a tractor three-print linkage (not shown) is provided at the front of the machine. Machines very similar to machine 12 are already marketed by the Mechanical Transplanter Company of Michigan, United States.

Apparatus 16 has two functions. First periodically to grip the bandolier 18 and move it one pitch forward and secondly to sever successive end block-embracing portions off the bandolier for delivery to machine 12.

Figure 1:
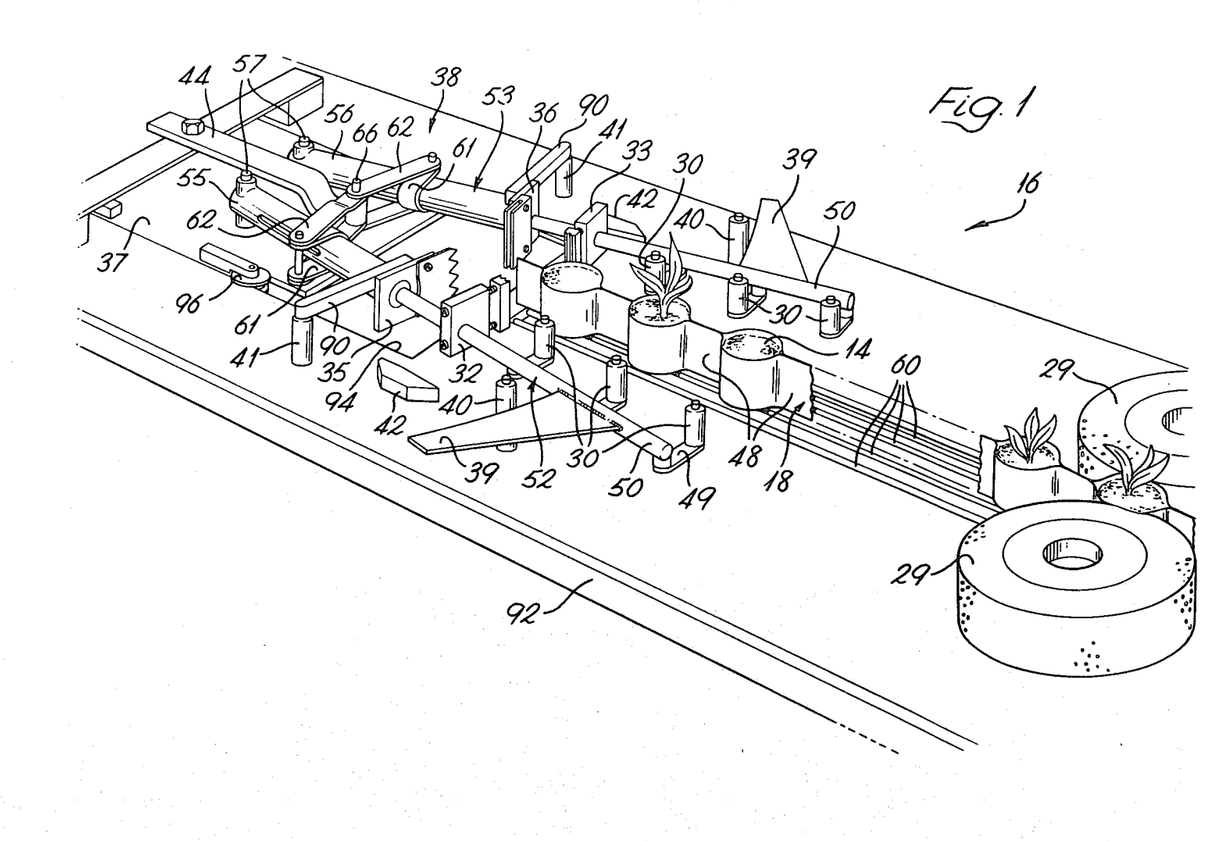
FIG. 1 is a general perspective view of an apparatus according to the present invention.
Figure 2:
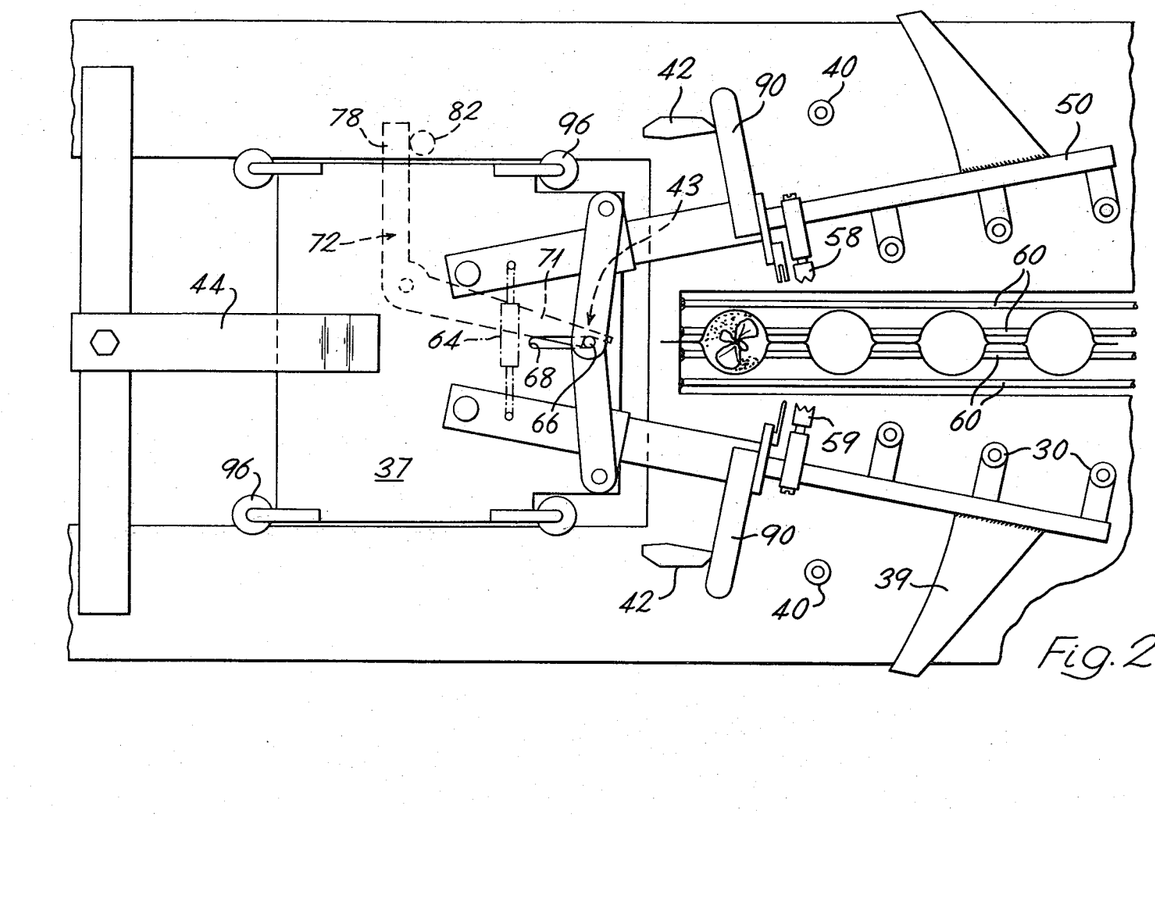
FIG. 2 is a detailed plan view of the apparatus as it will appear at a first stage of its operational cycle.

Referring now principally to FIGS. 1 and 2, the principal components of the transport mechanism for the bandolier in apparatus 16 include free-running foam rubber guide rollers 29, gripper bars 30, and clamp 32, 33. An alternative embodiment (not shown) is envisaged in which rollers 29 are replaced by a single powered roller (of the same material as rollers 29) and the tray of plants (indicated by reference numeral 100 in FIG. 8) is repositioned so that the bandolier turns through substantially 90° at this point irrespective of which section of the bandolier is currently passing round the powered roller. This modified design should help ensure that the bandolier stays in pitch throughout the feeding of a complete tray.

Returning now to FIGS. 1 and 2, reference numerals 35, 36 indicate the two components of a perforator for weakening the bandolier in an edge to edge direction and appropriate operation of the various components of the apparatus is initiated and controlled by the drive member 37 in conjunction with a control mechanism 38 comprised by stop means 39, 40, cam mechanism 41, 42, latch mechanism 43 (FIGS. 2 and 7) and delatching and relatching mechanisms 82 and 44.

A reciprocating crank 45 connects member 37 with a drive wheel 46. This in turn is driven by a chain and sprocket connection (partly indicated at 47) between the drive wheel 46 and the planting wheel 20 so as to synchronise the operation of the transplanter 12 with that of the block-handling apparatus 16.

Figure 3:
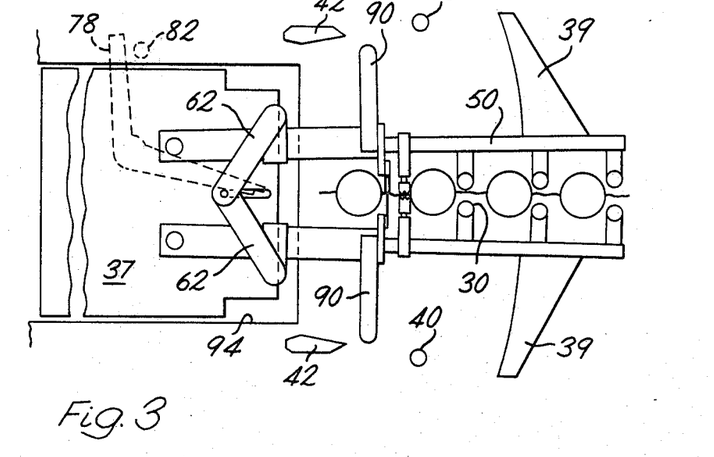
FIGS. 3 to 6 are plan views, on a reduced scale, relative to FIG. 2, of the apparatus as it will appear at subsequent stages of its operation.

It will be seen from FIGS. 1 and 2 that gripper bars 30 are spaced apart by the pitch of the bandolier blocks 14 so as to be able to engage the bandolier on opposite sides of spacer portions 48. The gripper bars 30 are in the form of freely rotating roller members carried by brackets 49 on first parts 50 of two internally sprung telescopic support members 52, 53. The second (support) parts 55 of these members are pivotally mounted at one end on the reciprocating drive member 37 for swinging motion about stub axles 57 between pivotally open positions (shown in FIGS. 1, 2, 6 and 7) and pivotally closed positions (shown in FIGS. 3, 4 and 5). In an alternative version (not shown), instead of using respective stub axles 57, the two parts 55 are pivotally mounted on drive member 37 by a single (common) stub axle.

At what may be termed their "inner" ends, support parts 50 carry the clamp components 32, 33 with their co-operating spring-loaded jaws 58, 59 (FIG. 2).

The two parts 35, 36 of the perforator, however, namely the punch 35 and the die member 36, are carried on support parts 55 adjacent clamp 32, 33. As best seen from FIG. 1, punch 35 is of saw-tooth configuration so as in operation to provide a line of perforations across the edge-to-edge dimension of the bandolier spacer portions 48. The co-operating die member 36 facilitates this by introducing an element of shear into the bandolier-perforating operation.

It will be appreciated that with the support members 52, 53 in their pivotally closed positions, the bandolier-engaging gripper bars 30 define a feed path A—A (FIG. 4) for the bandolier and during their passage along this path, the bandolier blocks move in sliding engagement with support rails 60 (FIG. 1) which together provide an open gridwork through which any material dislodged from the blocks can fall straight to ground without any risk of jamming up the apparatus.

At roughly their mid-lengths, the second (female) parts 55 of support members 52, 53 carry pivoted collars 61 which provide pivotal connections between these members and a toggle mechanism 62.

During operation of the apparatus, slight variations in the pitch of the bandolier occur as a result of the plant-bearing material in the pockets (usually peat) compressing when the bandolier is under tension. A damper 64 (indicated only in FIG. 2) acting between the two support members prevents them from approaching one another at too fast a rate as they move from their pivotally open to their pivotally closed positions. This allows the freely rotating rollers of the gripper bars 30 to reposition the bandolier as they roll into engagement with the spacer positions of the bandolier so as to ensure that such pitch inequalities do not accumulate.

Figure 7:
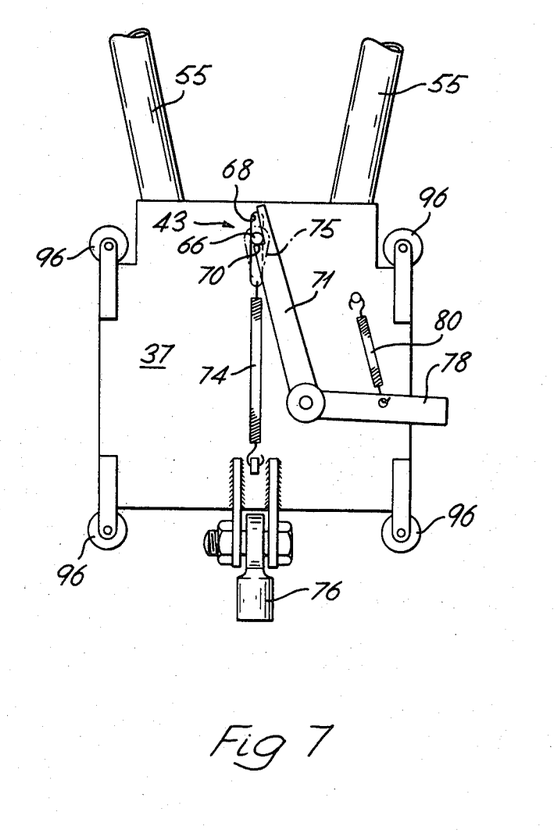
FIG. 7 is an underneath plan view of a catch mechanism present in the apparatus of FIGS. 1 to 6.

The two elements of the toggle mechanism 62 are connected together by a hinge-pin 66 which projects through a slot 68 (FIG. 2) in the drive member for engagement in an appropriate retaining notch 70 (FIG. 7) in one arm 71 of the bell crank lever 72 (FIGS. 2 and 7). A tension spring 74 (FIG. 7) connected between drive member 37 and, by a collar 75, also with hinge-pin 66, urges pin 66 along slot 68 towards a coupling 76 for connecting drive member 37 with the crank 45 referred to earlier. For clarity, collar 75 is only indicated in broken line in FIG. 7.

The free end of the other arm (78) of lever 72 is urged in the opposite direction by a second tension spring 80 connected between drive member 37 and the mid point of that arm. Thus the effect of this second spring is to maintain notch 70 in engagement with hinge-pin 66 so as to keep the toggle at its extended setting in which it will hold the support arms 52, 35 in their open positions.

To complete the arrangement, a stop 82 is provided (FIG. 2) which on engagement of the projecting portion of arm 78 will urge the lever 72 in a clockwise direction (as viewed in FIG. 7) to disengage notch 77 from hinge-pin 66 so that the pin can travel down to the opposite end of slot 68 under the influence of spring 74 as hereinbefore described.

The relatching mechanism is provided by the simple fixed abutment 44 indicated in FIGS. 1 and 2. This is positioned above drive member 37 in line with the feed path A—A. On engagement by the moving toggle hinge, abutment 44 forces the toggle mechanism to the expanded setting associated with the open position of the support members 52, 53 shown in FIGS. 1, 2, 6 and 7.

The stop means and cam mechanism referred to earlier in the description are constituted in the illustrated embodiment by arms 39 on support parts 50, by cam-engaging elements 41 mounted by brackets 90 on support parts 55, and by the stops (40) and cams (42) with which these arms and elements engage.

The various constituent parts of the block-handling apparatus 16 described above are supported, one way or another, on a base plate 92 which is bolted to the machine 12. This plate is apertured at 94 with the side edges of the aperture supporting four rollers 96 on which the drive member 37 is mounted.

It is important, when considering the operation of the apparatus and the assembly of which it forms a part, to remember that stops 40, stop 82, cams 42 and abutment 44 are rigidly secured to this base plate whereas the support members 52, 53 the drive member 37 and the various items supported on these members are able to move freely, subject of course to any restriction imposed on this movement by the control system 38.

Figure 4:
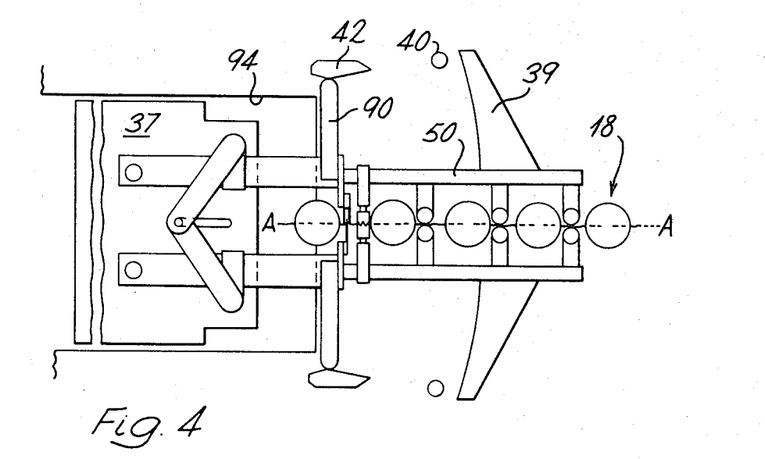
Figure 5:
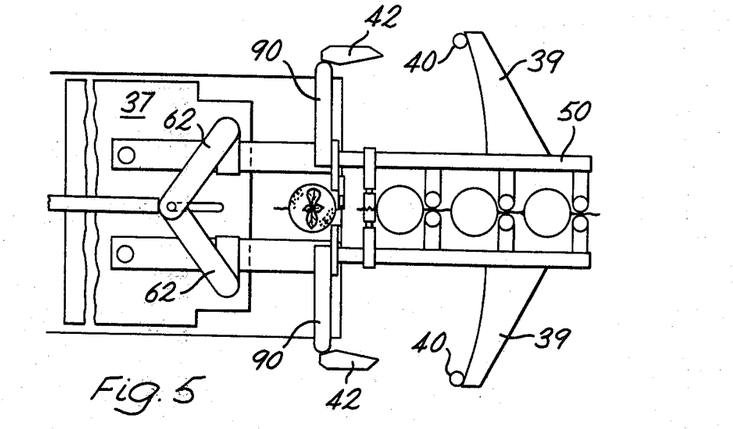

It is also important to note that the operative faces of the cams 42 are of a shallow vee formation with the apex of the vees positioned to be engaged by the cam-engaging elements 41 when the support members move into their fully closed positions (FIG. 4). It should further be noted that the stop-engaging faces of arms 39 should be curved as shown so that any swinging movement of these arms towards or away from feed path A—A while in engagement with the stops 40 should not result in a corresponding longitudinal movement of the support members 52, 53 parallel to the feed path.

The operation of apparatus 16 will now be described with particular reference to FIGS. 2 to 6 beginning with FIG. 2 which shows the apparatus at the beginning of its operational cycle.

In this setting, the support members 52, 53 are held in their open position by the extended toggle mechanism 62 and the drive member 37 is still moving towards the right (as viewed in FIG. 2) and approaching the end of its stroke. At the situation shown in FIG. 2, the projecting end 78 of cam lever 72 has just engaged with stop member 82 and as a result, further movement of the drive member to complete its stroke drives lever 72 clockwise (as viewed in FIG. 7) to release notch 70 from hinge-pin 66. This allows tension spring 74 to pull hinge-pin 66 to the other end of slot 68 so as to collapse the toggle 62 and, in so doing, to move the support members 52, 53, to the partially closed position shown in FIG. 3, in which the leading gripper bars 30 are positioned at the joining portion of the bandolier just behind the foremost block 14. Having the later gripper bars only partially operative at this stage enables longitudinal adjustment of the bandolier to take place in the event of any misalignment with gripper bars 30 as already discussed.

The reciprocating drive member 37 now begins its return stroke pulling the bandolier along with it and, in due course, the elements 41 engage the converging front faces of cams 42 and ride along these surfaces until they reach the cam apices (FIG. 4). At this point the support members 52, 53, gripper bars 30, holding clamp 32, 33 and perforator 35, 36 are all fully operative.

Further movement of the drive means along this stroke brings arms 39 into engagement with stops 40 (FIG. 5) thereby to prevent further longitudinal movement of support parts 50. The result is that the gripper bars 30, and more importantly the holding clamp 32, 33 lock the associated regions of the bandolier against further forward movement while the other parts 55 of the support members continue to move with the drive member 37 to tear off the end block-embracing portion from the bandolier. This then drops through aperture 94 into the waiting pocket 22 of transplanter machine 12. It will be appreciated that in the illustrated embodiment, the perforator 35, 36 and the clamp 32, 33 together provide the tear means referred in the more general description of the invention.

The detachment process above described is required to work with both wet and dry paper and occasionally also with some blocking compost present. The perforator 35, 36 with its large face-to-face clearance (typically 1 mm) between the punch and die components has been found to work satisfactorily under such conditions and thanks also to the spring-loaded clamp 32, 33 which grips the bandolier before the perforating punch touches it, a clean cut is usually made. When the paper is very wet and pliable, however, there is a tendency for it sometimes to be folded into the die by the punch. The tendency is resisted by having elements 41 ride over slightly divergent trailing faces of cams 42 so as partially to release the pressure at the perforator 35, 36 before tearing takes place. This allows the arms to part slightly (but not to such an extent that the punch is disengaged from the die) while the perforator continues its forward movement to detach the end block.

Figure 6:
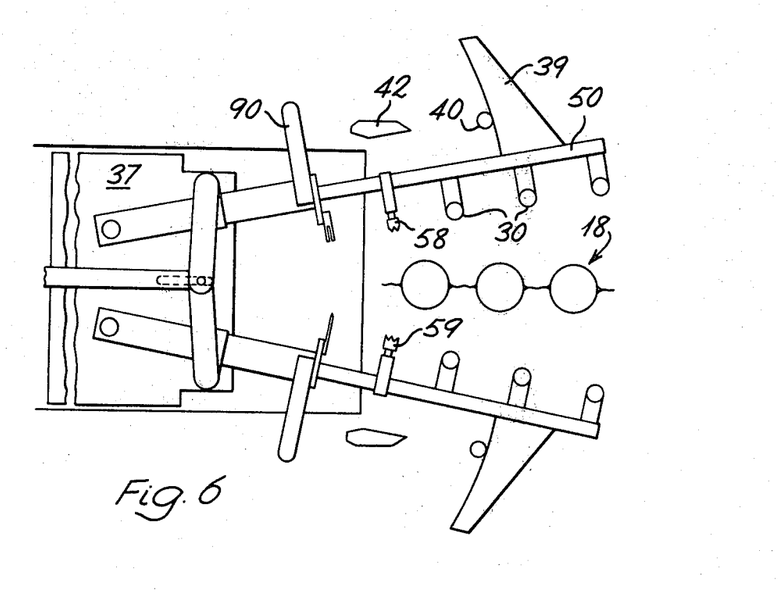

As the drive member continues on its reverse stroke, the toggle hinge eventually engages with the fixed abutment 44 (FIG. 5) which on continued movement of the drive member in the same direction will be effective to push the toggle 62 back to its extended position (as shown in FIG. 6). This, in turn, returns the support members 52, 53 back to their fully open positions.

At this point, the drive member will recommence its forward stroke moving elements 41 round the *outside* of cams 42 to return the apparatus to the setting illustrated in FIG. 2 where the holding clamp 32, 33 and perforator 35, 36 are ready to close behind the new end block of the bandolier to repeat the process above described.

It will of course be appreciated that the maximum separation of arms 39 from stops 40 (FIGS. 2 and 3) must be equal to the pitch of the bandolier blocks if in each cycle of operations only a single end block-embracing portion is to be detached from the rest of the bandolier. This is because in each cycle of operations, it is the value of this maximum separation that determines the forward travel of the bandolier.

In the illustrated embodiment, the gripper bars 30, the clamp 32, 33 and the support member parts 50 on which they are mounted, together provide the feed means referred to in the more general descriptions of the invention.

As already indicated above, the block-depositing transplanter machine may be of conventional design and, generally speaking, any such machine using a mechanical feed transfer system for transferring plant blocks from an input location to ground can be used in association with the block-handling apparatus of the present invention which in each case will operate automatically to provide individual block-embracing end portions of the bandolier to the input location of the machine. For example, the transplanter machine illustrated in FIG. 8 could be replaced by one in which the detached blocks are lowered by chain conveyors into furrows cut by shares (e.g. as in the multirow machine currently marketed by JAVO b.v. Holland). Obviously in any such combination with a conventional transplanter machine, it may be desirable, even if not always necessary, to modify the machine e.g. to better suit it for use with the block-handling apparatus of the present invention. With the machine shown in FIG. 8, for example, six scraper plates 98 have been added to the planting wheel 20 to remove earth attaching to the pockets 22 during operation of the machine. The scraper plates are so positioned that earth scraped off from the outside of the pockets will be deposited on the ground at positions midway between successive growing block locations. This scraping action is achieved by virtue of the relative motion arising from the fact that the scraper plates 98 are at all times radially disposed relative to the rotation axis of planting wheel 20, whereas the pockets 22 are continually oriented so as always to be vertically disposed.

Turning now to the bandolier to be used with the apparatus, the joining medium is conveniently a Kraft paper coated on one side with a biologically degradable thermoplastics material e.g. as manufactured by Coloroll Limited of Nelson, Lancashire under the trade name "Byoplastic". Alternatively a biodegradable Kraft paper could be used in which part of the normal wood pulp content has been replaced by synthetic fibres which are capable of being heat-sealed e.g. as manufactured by the Shell Chemical Company under the trade name "Carifill". Both of these papers are heat-sealable so that heat sealing can be used to attach together the spacer portions of the bandolier. As an alternative, a biodegradable Kraft paper coated on one side with a latex adhesive could be used with the spacer portions formed by contacting face regions of two strips of the paper.

Further details of bandoliers and of a machine and method for making the bandoliers are disclosed in U.K. patent specification No. 1,545,554 (National Research Development Corporation).

The apparatus of the present invention may be used to feed the transplanter machine with growing pots containing one of a variety of different plants e.g. lettuce, celery, onions, plants in the cabbage family etc. In all cases, guide wires (not shown) are preferably fitted to the apparatus to prevent the leaves of these plants interfering with its operation. In a typical use, e.g. planting lettuce, the ground speed of the machine would be ¾ m.p.h. and the apparatus 16 would be operated to provide planting wheel 20 with a new charge every 0.75 or so seconds so as to enable the wheel to transplant the lettuce-bearing growing blocks at ground spacings of ten inches between plants.

Differences in individual plant spacing may be accommodated for example by varying the drive to the block-handling apparatus 16 e.g. so that it loads every other or every third pocket 22 of the transplanting machine 12. Alternatively, or additionally, the number of pockets can be reduced or increased and the drive to apparatus 16 adjusted accordingly. In all instances, however, the peripheral speed of the planting wheel (at the pockets 22) should be the same as the ground speed of the assembly 10 so that there is no relative horizontal motion between pocket and ground at the time of planting.

In a modification of the block-handling apparatus above described, the clamp 32, 33 is replaced by a second perforator identical, or very similar, in construction to perforator 35, 36 and the two perforations then operate to remove the whole or at least the larger part of the spacer portions 48 of the bandolier associated with any particular block-embracing portion.

Other modifications to the block-handling apparatus and/or to the transplanter machine are also possible of course. For example it is not essential that a bandolier weakening means in the form of a perforator should be present and an alternative embodiment in which the perforator has been replaced by a simple guillotine is shown in FIG. 9 onwards where the same reference numerals have been retained for items identical to or similar to those appearing in the earlier embodiments.

Figure 9:
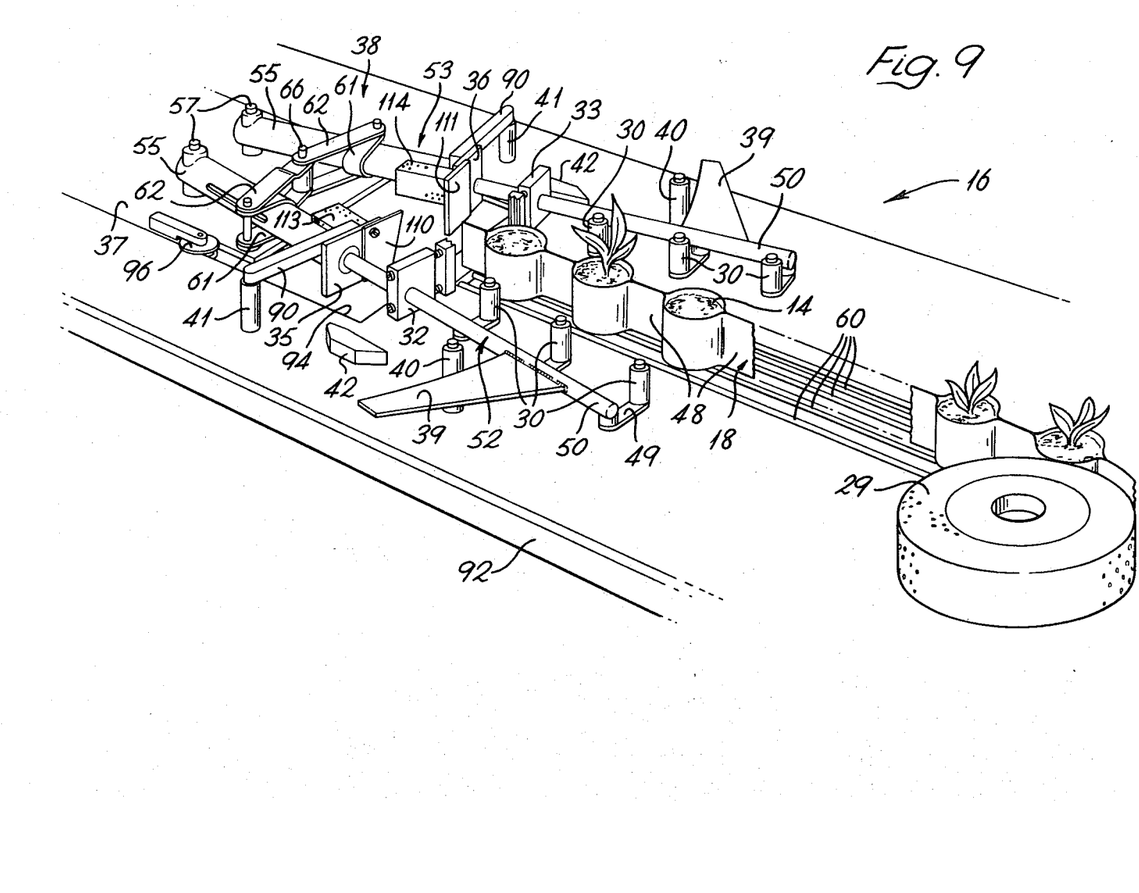
FIG. 9 is a general perspective view of another apparatus according to the present invention.

Thus referring first to FIG. 9, the transplanter assembly (10) comprises, as before, a transplanter machine 12 for transplanting plant-bearing growing blocks 14 in the ground and a block-handling apparatus 16 for presenting the machine with individual vertically-orientated growing blocks from a bandolier 18 charged with such blocks. For clarity and convenience, the plants have again been omitted from the illustration.

As already described, apparatus 16 has two functions. First, periodically to grip the bandolier 18 and to move it one pitch forward and secondly to sever successive end block-embracing portions off the bandolier for delivery to machine 12.

The principal components of the transport mechanism in apparatus 16 include gripper bars 30, clamp 32, 33 and a powered continuously rotating foam rubber guide roller 29 which is driven in an anti-clockwise sense (as viewed in FIG. 9) but with a peripheral velocity in excess of that imparted to the bandolier by the feed means during its intermittent travel towards the detachment means.

As with the earlier embodiments, the gripper bars 30 of the block-handling apparatus 16 are spaced apart by the pitch of the bandolier blocks 14 so as to be able to engage the bandolier on opposite sides of spacer portions 48. The gripper bars 30 are in the form of freely rotating roller members carried by brackets 49 on first parts 50 of two internally sprung telescopic support members 52, 53. The second (support) parts 55 of these members are pivotally mounted at one end on a reciprocating drive member 37 for swinging motion about stub axles 57 between pivotally open positions and pivotally closed positions.

At what may be termed their "inner" ends, the support parts 50 carry the clamp components 32, 33. The two blades 110, 111 of the detachment means, however, which are designed to shear through the bandolier to cut off the end block-engaging portion, are carried on support parts 55 adjacent clamps 32, 33 and resilient sponge rubber pads 113, 114 are carried just behind the blades to hold the block-engaging portion of the bandolier in place during and immediately following detachment.

At roughly their mid-lengths, the second (female) parts 55 of support members 52, 53 carry pivoted collars 61 which provide pivotal connections between these members and a toggle mechanism 62.

Figure 10A:
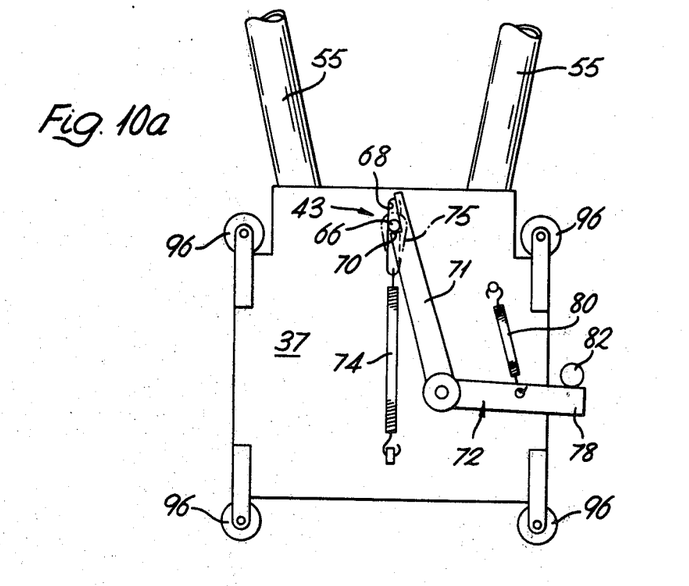
FIG. 10a is an underneath plan view of a catch mechanism present in the apparatus of FIG. 1.

The two elements of the toggle mechanism 62 are connected together by a hinge-pin 66 which projects through a slot 68 (FIG. 10a) in the drive member for engagement in an appropriate retaining notch 70 in one arm 71 of a bell crank lever 72. A tension spring 74 connected between drive member 37 and, by a collar 75, also with hinge-pin 66, urges pin 66 along slot 68 away from support parts 55. For clarity, collar 75 is only indicated in broken line in FIG. 10a.

The free end of the other arm (78) of lever 72 is urged in the opposite direction by a second tension spring 80 connected between drive member 37 and the mid point of that arm. Thus the effect of this second spring is to maintain notch 70 in engagement with hinge-pin 66 so as to keep the toggle at its extended setting in which it will hold the support arms 52, 53 in their open positions.

To complete the arrangement, a stop 82 is provided which on engagement of the projecting portion of arm 78 will urge the lever 72 in a clockwise direction (as viewed in FIG. 10a) to disengage notch 70 from hinge-pin 66 so that the pin can travel down to the opposite end of slot 68 under the influence of spring 74 as hereinbefore described.

The relatching mechanism is provided by a link 116 (FIG. 10b) which extends from hinge-pin 66 to a roller 118 engaging one edge of a drive arm 120.

Figure 10B:
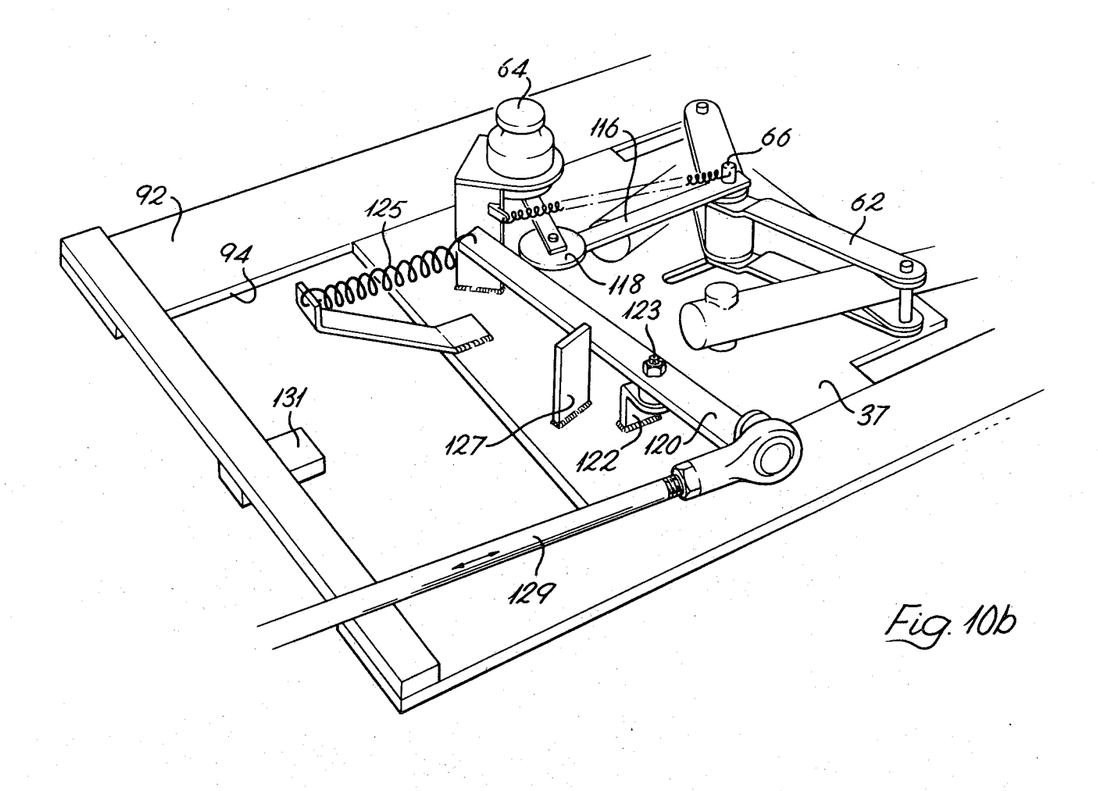
FIG. 10b is a perspective view showing the mechanical drive to the feed means.

The drive arm is mounted on a support bracket 122 welded to drive member 37 for restricted pivotal movement about a vertical stub axle 123.

To one side of axle 123, the drive arm 120 is urged by tension spring 125 into engagement with an upstanding lug 127 also welded to drive member 37. On the other side of axle 123, the drive arm is connected to a reciprocating crank 129.

The arrangement is completed by a damper 64 preventing support members 52, 53 from approaching one another at too fast a rate and by a stop 131 secured to a base plate 92 which is bolted to the machine 12 and which supports, one way or another, the various constituent parts of the block-handling apparatus 16. This plate is apertured at 94 with the side edges of the aperture supporting four rollers 96 on which the drive member 37 is mounted.

It is important, when considering the operation of the apparatus and the assembly of which it forms a part, to remember that stops 40, stop 82, cams 42 and abutment 131 are rigidly secured to this base plate whereas the support members 52, 53, the drive member 37 and the various items supported on these members are able to move freely, subject of course to any restriction imposed on this movement by the stops 40 etc.

It is also important to note that the operative faces of the cams 42 are of a shallow vee formation with the apex of the vees positioned to be engaged by the cam-engaging elements 41 when the support members move into their fully closed positions. It should further be noted that the stop-engaging faces of arms 39 should be curved as shown so that any swinging movement of these arms towards or away from the bandolier feed path while in engagement with the stops 40 should not result in a corresponding longitudinal movement of the support members 52, 53 parallel to the feed path.

The operation of apparatus 16 will now be described from the beginning of its operational cycle, at which the support members 52, 53 are held in their open position by the extended toggle mechanism 62 and the drive member 37 is still moving towards the right (as viewed in FIG. 9) and approaching the end of its stroke. At this situation, the projecting end 78 of cam lever 72 has just engaged with stop member 82 and as a result, further movement of the drive member to complete its stroke drives lever 72 clockwise (as viewed in FIG. 10a) to release notch 70 from hinge-pin 66. This allows tension spring 74 to pull hinge-pin 66 to the other end of slot 68 so as to collapse the toggle 62 and, in so doing, to move the support members 52, 53 to the partially closed position in which the leading gripper bars 30 are positioned at the joining portion of the bandolier just behind the foremost block 14. Having the latter gripper bars only partially operative at this stage enables longitudinal adjustment of the bandolier to take place in the event of any misalignment with gripper bars 30.

The reciprocating drive member 37 now begins its return stroke pulling the bandolier along with it and, in due course, the elements 41 engage the converging front faces of cams 42 and ride along these surfaces until they reach the cam apices. At this point the support members 52, 53, gripper bars 30, holding clamp 32, 33 and blades 110, 111 are all fully operative.

Further movement of the drive means along this stroke brings arms 39 into engagement with stops 40 thereby to prevent further longitudinal movement of support parts 50. The result is that the gripper bars 30, and more importantly the holding clamp 32, 33, lock the associated regions of the bandolier against further forward movement while the other parts 55 of the support members continue to move with the drive member 37 to tear off the end block-embracing portion from the bandolier if, for any reason, the blades 110, 111 have failed to cut off this portion cleanly.

Figure 11:
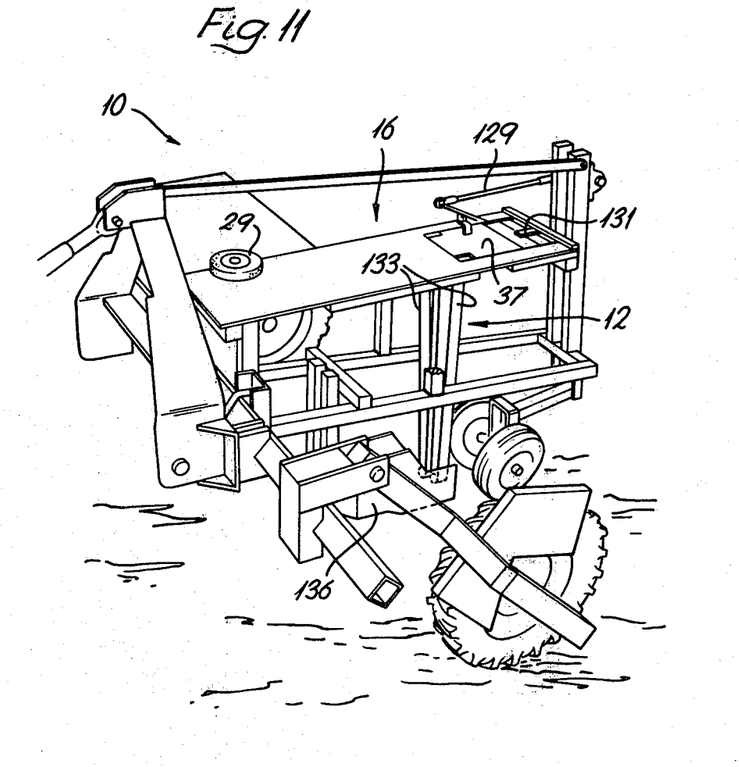
FIG. 11 is a side perspective view of a transplanter assembly showing the position of the vertical belt conveyors.

The detached block will now be held in place by parts 113, 114 as the continued movement of the crank 129 moves the leading edge of support member 37 into engagement with the stop 131. With the support member 37 engaging stop 131 as above described, the feed means will begin its dwell period during which further motion of the crank 129 in the same direction as before will rotate drive arm 120 about axle 123 (against the action of spring 125) to open the toggle and release the detached block-engaging portion of the bandolier. This latter drops a small distance through aperture 94 to a pair of belt conveyors 133, 133 (FIG. 11) which transport the detached bandolier portion substantially vertically downwards for discharge into a furrow preformed by a conventional share 136 during the forward motion of the apparatus. Releasing the blocks during the dwell period of the feed means ensures that the detached blocks maintain their original vertical orientation as they drop to the belt conveyors 133, 133 and the latter maintain this orientation until discharge.

The continued rotation of the crank wheel will now reverse the direction of crank motion commencing the return stroke of the feed means once drive member 120 has moved back into contact with lug 127. During this stroke, elements 41 move round the *outside* of cams 42 to return the apparatus to the setting where the holding clamp 32, 33 and blades 110, 111 are ready to close behind the new end block of the bandolier to repeat the process above described.

It will of course be appreciated that the maximum separation of arms 39 from stops 40 must be equal to the pitch of the bandolier blocks if in each cycle of operations only a single end block-embracing portion is to be detached from the rest of the bandolier. This is because in each cycle of operations, it is the value of this maximum separation that determines the forward travel of the bandolier.

Figure 12:
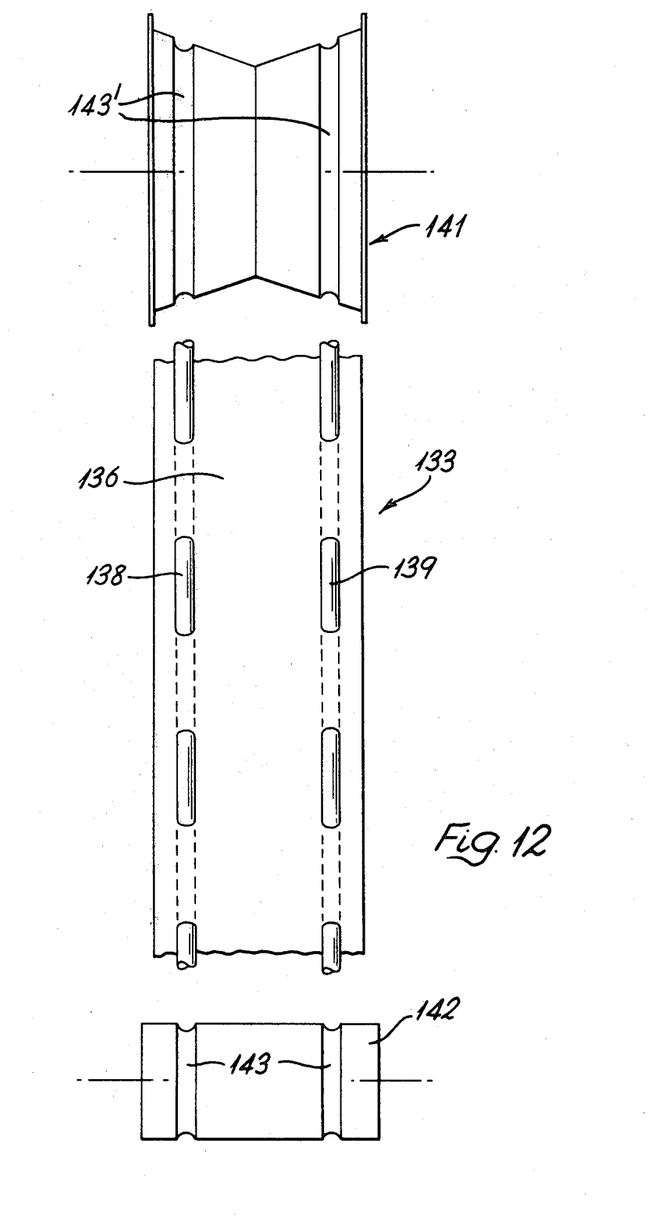
FIG. 12 is a scrap view of one of the conveyor belts and of the pulleys around which it passes.

The construction of the belt conveyors 133 is best seen from FIG. 12 which shows them to comprise a flat rubber-based belt 136 reinforced by a pair of plastics round-section belts 138, 139 woven in and out of successive apertures in the belt 136 as shown in the drawing. At their upper ends, the conveyors pass around a pair of wasted and flanged rollers 141 and at their lower ends around a pair of parallel sided rollers 142 also illustrated in the Figure. Both sets of rollers are provided with peripheral grooves 143 to accommodate the presence of the round belts 138, 139 in the conveyors.

Figure 13:
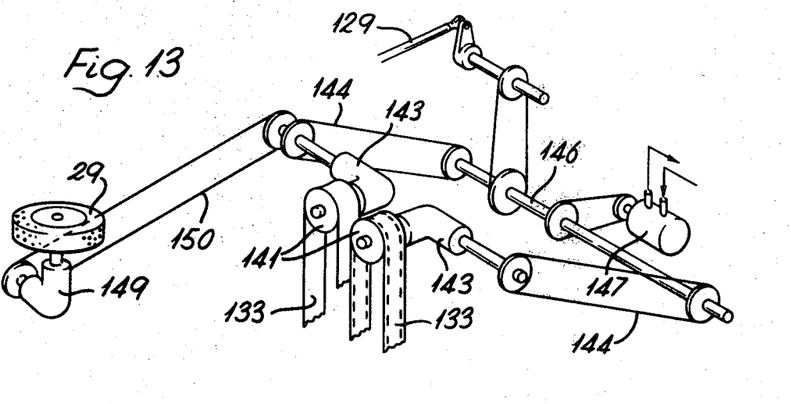
FIG. 13 shows the drive lay-out for the transplanter.

Rollers 141 appear again in FIG. 13 from which it will be seen that they are driven through bevel gear boxes 143 from a chain and sprocket connection 144 to a lay shaft 146. Reference numeral 147 indicates the hydraulic motor from which this shaft is driven. This motor may be powered, for example, from the external supply of the tractor used for towing the transplanter.

A flow control valve is conveniently included in the hydraulic circuitry to the motor to allow the motor speed to be varied at will.

The lay shaft 146 is also used to drive the crank 129 referred to earlier while the guide roller 29 is driven through a bevel gearbox 149 by a chain and sprocket connection 150 to the input shaft for one of the two gear boxes 143.

In an alternative embodiment (not shown) of the present invention, the conveyor belts 133, 133 are replaced by a planting wheel similar to that described in copending application 7927197 but with the square-section planting pockets of that earlier design replaced by ones of oval cross-section to encourage a degree of line-contact which should maintain the blocks upright in the planting pockets.

Lastly it needs to be pointed out that although only single row machines have been described throughout, these could readily be adapted by one skilled in the art to provide a multi-row machine e.g. consisting of a number of single-row machines ganged together. This would in most cases be the preferred version of the machine. Obviously any ground wheels present should preferably be in line with the tractor wheels and adjustable for inter-row spacing.

We claim:

1. Apparatus for handling a plurality of spaced growing blocks linked together by substantially flat strips to form a bandolier, said apparatus comprising: detachment means sequentially operable to detach a growing block from an end of said bandolier; at least one gripper element mounted on support means which are selectively movable to bring said gripper element into engagement with a strip of said bandolier to move the end of said bandolier in a path towards the detachment means in an incremental step, and to move the gripper element out of engagement with the strip, said support means having a component of movement perpendicular to the bandolier's path to bring the gripper element into and out of contact with the strip and being telescopically movable with a component of motion parallel to the bandolier's path to step the bandolier towards the detachment means whereby each sequential operation of the detachment means detaches a single growing block from the end of the bandolier.

2. Apparatus as claimed in claim 1 wherein gripper elements are mounted on separate support means arranged to move the respective gripper elements into engagement with opposite sides of the bandolier.

3. Apparatus as claimed in claim 2 wherein said separate support means pivot about respective pivots to move their associated gripper elements into and out of engagement with the bandolier.

4. Apparatus as claimed in claim 3 wherein the telescopic movement of each support means is in a direction passing through and perpendicular to its respective pivotal axis.

5. Apparatus as claimed in claim 4 in which the support means are associated with a control system comprising a latch mechanism which operates to move them from a pivotally open to a semi-closed position, a cam mechanism which operates to move them from the semi-closed position to a fully closed position, and a delatching mechanism which operates to return the support means to the fully open position.

6. Apparatus as claimed in claim 5 in which the pivot axis for each support means is provided by a pivotal connection between the support means and a reciprocating drive member, and the latch, cam and delatching mechanisms are automatically brought into operation in dependence on the position of the drive member relative to a base member of the apparatus, the drive member being arranged so that between the operation of the cam and delatching mechanism, the continued movement of the drive member towards the position at which delatching will occur results in a corresponding elongation of the fully closed support means.

7. Apparatus as claimed in claim 6 in which block-engaging means also are mounted on the support means adjacent the detachment means whereby when a block is detached from the end of the bandolier, it is supported by the block-engaging means, said block-engaging means being adapted to release the detached block during a dwell period between incremental steps of movement of the bandolier.

8. Apparatus as claimed in claim 7 in which a stop is provided to prevent translational movement of the gripper elements during further movement of the drive member following operation of the detachment means but immediately prior to operation of the delatching mechanism, said further movement of the drive means being operative to open the block-engaging means to release the detached block therefrom.

9. Apparatus as claimed in claim 1, wherein the bandolier is fed by continuously-rotating means having a peripheral velocity in excess of that imparted to the bandolier during the incremental steps of the bandolier towards the detachment means.

10. Apparatus as claimed in claim 1 arranged in combination with a transplanter machine comprising a pair of belt conveyors operative to transport in a substantially vertically downwards direction each block detailed from the bandolier.

11. Apparatus as claimed in claim 1 wherein the detachment means comprises strip-weakening means mounted on a first portion of the support means and holding means spaced along the bandolier path from the strip-weakening means and mounted on a second portion of the support means, said first and second portions being relatively displaced during telescoping movement of the support means whereby a tearing action is achieved on the strip joining the growing block at the end of the bandolier to its adjacent block due to an increased separation of the strip-weaking means and the holding means.

12. Apparatus as claimed in claim 1 in which block-engaging means also are mounted on the support means adjacent the detachment means whereby when a block is detached from the end of the bandolier, it is supported by the block-engaging means, said block-engaging means being adapted to release the detached block during a dwell period between incremental steps of movement of the bandolier.

* * * * *